United States Patent [19]

Bertheas

[11] 3,761,821

[45] Sept. 25, 1973

[54] SYSTEMS FOR PROCESSING AND GENERATING FREQUENCY MODULATED SIGNALS

[75] Inventor: Jean Bertheas, Paris, France

[73] Assignee: Thomson—CSF, Paris, France

[22] Filed: Oct. 7, 1971

[21] Appl. No.: 187,408

[30] Foreign Application Priority Data

Oct. 16, 1970 France .............................. 7037459

[52] U.S. Cl. ......... 325/496, 179/15.55 R, 325/38 R

[51] Int. Cl. ............................................ H04b 1/00

[58] Field of Search ............. 325/38 R, 38 A, 38 B, 325/60, 496; 179/15 AC, 15 AV, 15 BW, 15.55 R, 100.2 MD, 100.2 T; 333/70 T

[56] References Cited

UNITED STATES PATENTS

| | | | |
|---|---|---|---|
| 3,036,157 | 5/1962 | Franco et al. | 179/15 BC |
| 3,274,341 | 9/1966 | Allen | 179/15 AC |
| 3,462,555 | 8/1969 | Presti | 179/15 AC |
| 3,560,659 | 2/1971 | Greefkes | 179/15 AC |
| 3,588,364 | 6/1971 | Wallingford et al. | 325/38 B |

FOREIGN PATENTS OR APPLICATIONS

| | | | |
|---|---|---|---|
| 814,158 | 5/1959 | Great Britain | 179/15.55 T |

*Primary Examiner*—Albert J. Mayer
*Attorney*—Cushman, Darby & Cushman

[57] ABSTRACT

A system for signal processing using matched filtering after a time compression is provided wherein several signal ($S_1$,..$S_n$) are simultaneously processed through a multichannel system. Each signal is successively frequency translated, transformed into splitted complex signal components, further sampled, multiplexed and then quantized. Apparatus is provided for time-compression and a multiplex transmission of the said quantized signal components which are then reconverted, in a transfer unit, into an analog signal translated in the frequency band of a matched filter. Each of the functional units being controlled in accordance with the rythms ($H_0$ , ... $H_n$) dictated by signals of a control source. The matched filter produces a mutual correlation function between the filter input signal and a time-compressed replica of the transmitted signal waveform at the said filter output. An output unit thereafter produces the processed signal. The system can be utilized to effect matched filtering of signals coming from panoramic sonar equipment with multiple preformed channels.

13 Claims, 4 Drawing Figures

SYSTEMS FOR PROCESSING AND GENERATING FREQUENCY MODULATED SIGNALS

The present invention relates to improvements in or relating to systems for processing and generating frequency-modulated signals. Said improvements relate to matched filtering systems for frequency-modulated signals and more particulary to system arrangements for simultaneous processing of signals in a large number of channels, or transmission paths, of a signal wave. The need for such occurs in particular in sonar equipment operating with several channels or beams, wherein it is necessary to simultaneously process a plurality of channels, possibly in excess of 100.

A prior art systems with matched filtering for frequency-modulated signals, and utilizing time compression techniques followed by pulse compression, is described in the U.S. Pat. 3,639,695. In that system, the pulse compression is based upon the characteristic of matched filters to continuously provide the correlation of the filter input sonar signal with a replica of the transmitted signal, said correlation being obtained point by point by sampling the output signal from said matched filter. The filter is for example a dispersive delay line matched to a pulse signal of duration $T_1$ and frequency bandwidth $B_1$, this signal being related to the transmitted sonar signal in a homothety ratio K such that the relationships :

$$B_1T_1 = B_0T_0 \text{ and } T_0/T_1 = B_1/B_0 = K$$

are satisfied :

Where $T_0$ is the duration of the signal transmitted sonar signal and $B_0$ its bandwidth. The signals are filtered, sampled at a sampling frequency in excess of $2B_0$ (satisfying the SHANNON Information Transmission Theory) and quantized by means of an analogue-to-digital converter. In the preferred embodiment the sampling rate is 2.5 $B_0$. The dispersive delay line then provides the correlation with the replica of the transmitted sonar signal of the successive signal portions leaving in the store, these portions differing by one sample from one another. The correlation function which is sought, by means of this processing, is obtained by sampling the output signal from the dispersive delay; line with each memory circulation, at a rate of $1/T_1$. In other words, each signal portion leaving the circulating store, is obtained at a single point of the correlation function, because of the equality between the duration $T_0$ of the transmitted sonar signal and the duration of retention of the input signal in the circulatory store.

Thus, in the aforementioned system while, it is possible to process one frequency-modulated signal channel in order to effect matched filtering of said signal, the system requires certain modifications if it is also to simultaneously be able to process several signal channels in the same manner.

The existence of this kind of problem and the possibility of processing several signal channels, have been recognised, in particular on page 527 of the magazine "The Journal of the Acoustical Society of America" — volume 46, No. 1, 1969, in an article by P. TOURNOIS and J. BERTHEAS.

One of the objects of the present invention is to provide an improved system for processing and generating frequency modulated signals by introducing design and constructional modifications enabling the system to effect simultaneous processing of several signal channels.

In accordance with the present invention, a system is provided for processing and generating frequency-modulated signals, based upon the matched filtering property of a dispersive delay line which continuously produces the mutual correlation function between the input signal and the replica of the transmitted signal. The input signal is time compressed before being supplied to the said dispersive delay line. The system is characterized in that it carries out the simultaneous processing of N input signals and comprises within the chain used for the simultaneous processing of the N channels of the signal, a unit for carrying out frequency translation, sampling and conversion of the independent input signals which produce the quantized components of the generated signals, followed by a time-compression and time-division multiplex unit connected to a unit for converting signals into a signal which is located in the frequency band of the matched filter. Further there is provided at least one source for producing the signals controlling the circuits of said units, a matched filyer receiving the converted signal and producing the correlation function between the received signal and the replica of the transmitted signal, and an output unit with a negative-feedback loop for effecting automatic gain control of the signal for operating purposes.

Other features of the invention will become apparent from the ensuing description, given by way of example and illustrated by the figures in which.

Figure 1:
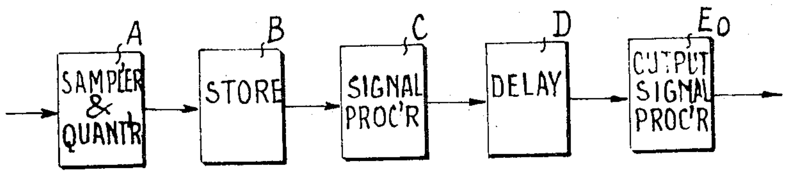
FIGS. 1 and 2 are simplified diagrams of a known system for processing frequency-modulated signals.
Figure 2:
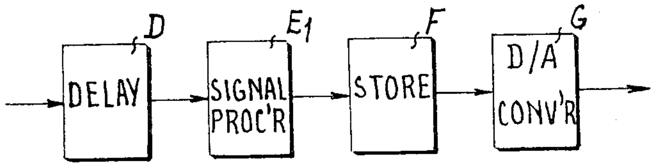

In order to facilitate the explanation of the improvements of the present invention a description of the prior art system described in the aforementioned U.S. Pat. 3,639,695 will now be briefly described with respect to FIGS. 1 and 2.

A block diagram based upon a matched filtering system for use in reception, shown in FIG. 1 wherein the sampler and quantizer A of the system incorporates a bandpass filter followed by a sampling circuit and an analog-to-digital converter. The latter is connected to the recording circuit of the store B which is made up of a digital circulatory store and a read-out circuit therefor. The signal processor C with transfer circuits, comprises a digital-to-analog converter, a bandpass filter and a mixer, providing the connection between the store B and dispersive delay line D. At the output of the delay line D, an output signal processor $E_o$ made up of a modulation envelope detector, a sampling device and a low-pass filter, produces the desired mutual correlation function.

Those skilled in the art will be well aware that a dispersive delay line can be used not only to effect time compression of a frequency-mmodulated pulses, but, may also produce a long linearly frequency-modulated pulse from a short pulse applied to its input.

Another aspect of the processing based upon this property and relating more particularly to the transmission end of the system, has likewise been disclosed in the aforementioned U.S. Patent. In a system of that kind, a block diagram of which is shown in FIG. 2, the dispersive delay line D is supplied with short pulses which are converted into long frequency-modulated pulses, the latter then being time expanded by the value K, i.e., a desired ratio. To this end, the dispersive delay line D is connected, through another signal processor $E_1$ comprising a mixer, a bandpass filter, a sampling device and an analog-digital converter, to a time expander store unit F which is made up of a digital circulatory store and associated recording and read-out circuits. A unit G made up of a digital-to-analog converter and a filter, links this time expander unit F to the output of the system.

It is worthy of note that the unit F can readily effect the time reversal of the pulse response of the filter, which is necessary to the production of the signal which is to be transmitted.

Figure 4:
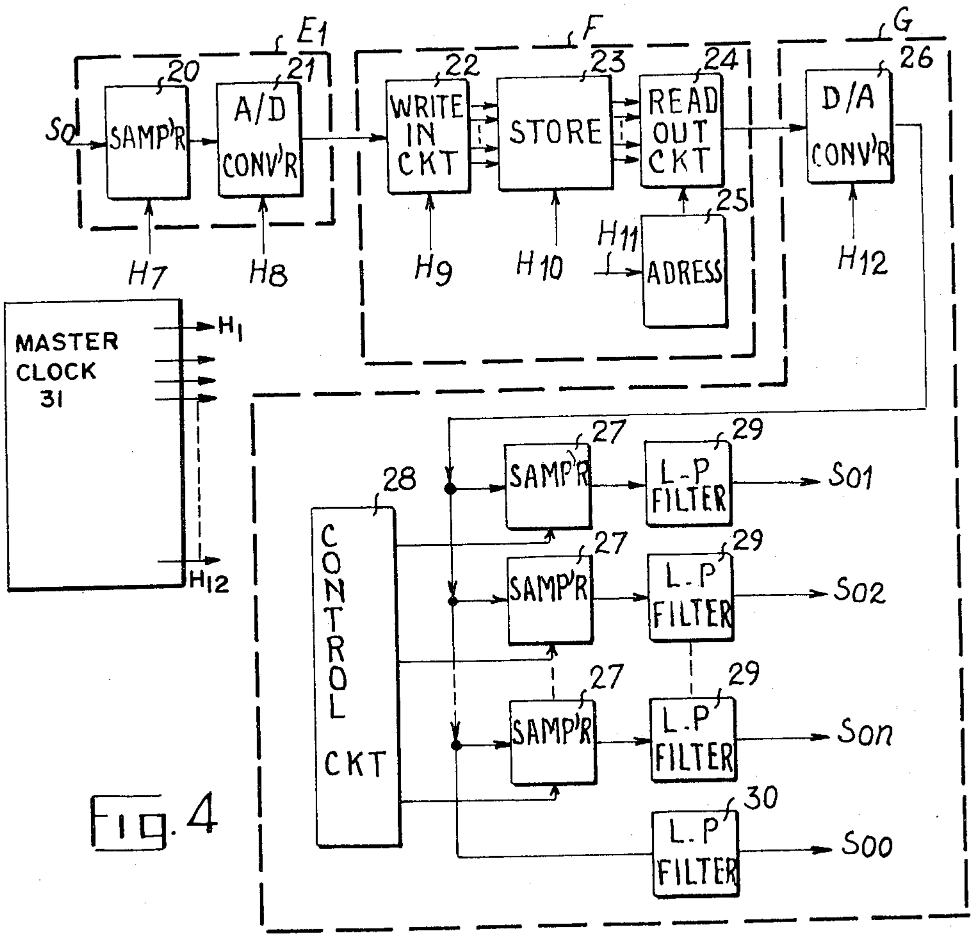
FIG. 4 is a block diagram illustrating the units which, in association with the system of FIG. 3, define a particular mode of operation of said system.
Figure 3:
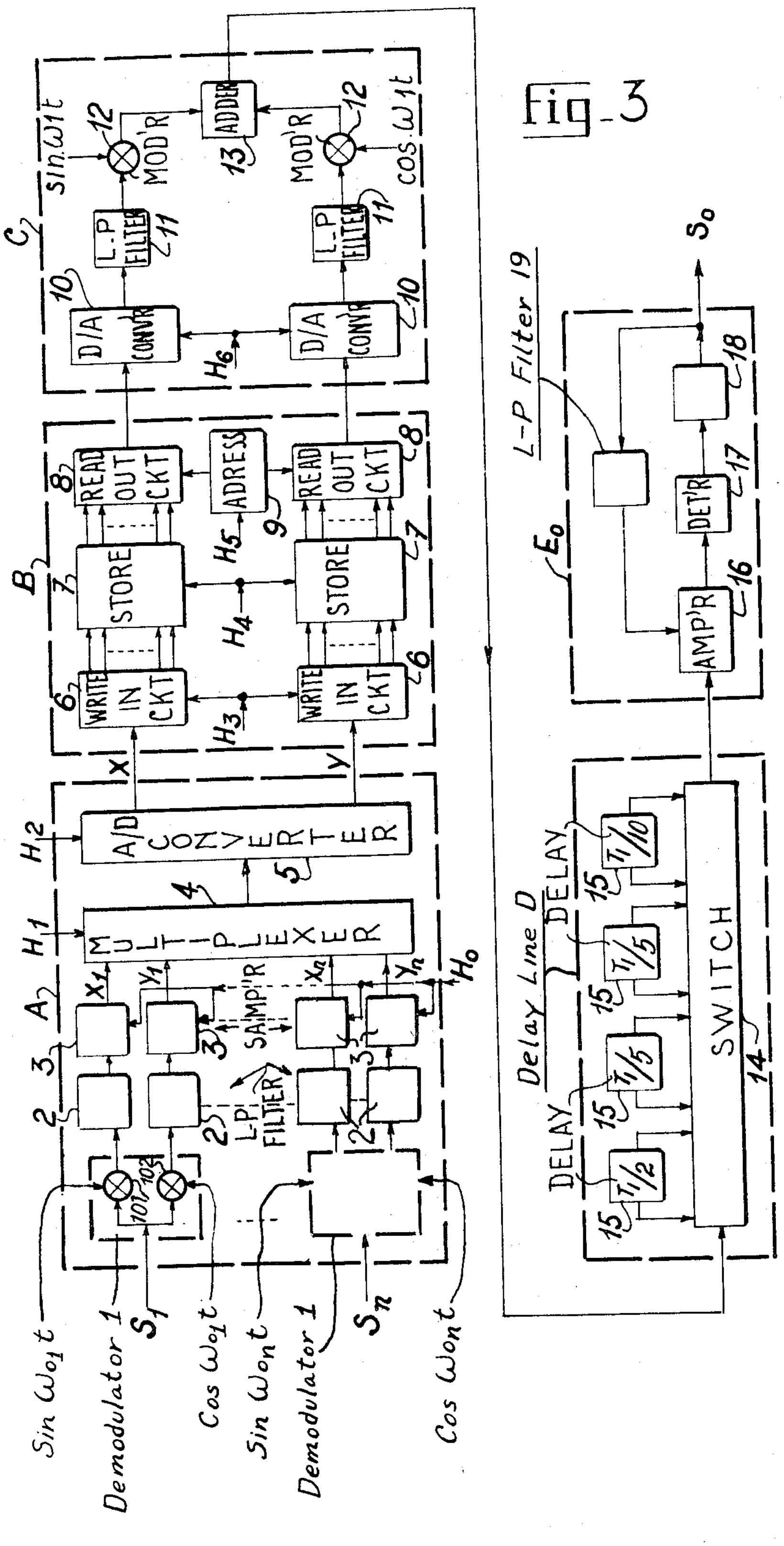
FIG. 3 is a block diagram of an embodiment of the system proposed by the present invention for processing frequency-modulated signals.

It will be observed here that the functional units in the form of blocks, are marked in FIGS. 3 and 4 by the same letters as those which have been used in FIGS. 1 and 2. Similarly, the letter symbols already defined and used will be used throughout the remainder of the text.

One of the chief modifications introduced for improving the said known system disclosed in the aforementioned U.S. patent, which makes it possible, for example, to utilise a time division multiplex technique in order to process a plurality of input signals, consists in modifying the duration for which the input signal portions are retained in the circulatory stores so that the duration, which shall be referred to as $T_2$, is longer than the duration $T_0$ of the transmitted sonar signal.

After time compression by the ratio K, of the circulatory stores, the signal portions injected into the dispersive delay line have a duration or length of $T_2/K$. Thus, at the output of said dispersive delay line a signal portion of duration $T_2K - T_1$, can be processed where $T_1$ is the pulse response time of the line, this value, because of the time compression, being equal to $T_0/K$.

This usable signal portion is thus similar, to the ratio $K$, of a portion of duration $T_2 - T_0$ of the mutual signal-i.e., a replica correlation function which is sought to be obtained.

In providing said signal portion, the dispersive delay line is used only during the time $T_2/K$. It is therefore possible to effect time-division multiplexing at the line input in order to process $N$ input signals, where N is defined by the relationship :

$$N = T_2 - T_0/T_2/K = K\ (\ 1 = T_0/T_2\ )$$

If the number $N$ of signals to be processed has already been fixed, the value of the duration $T_2$ is defined by the relationship $$T_2 = T_0\ (\ K/K = N\ )$$

The theoretical fundamentals, which enable a better understanding of the modifications, which are necessary in order to implement the improved matched filtering system, for securing simultaneous processing of signals in a large number of receiving channels, now having been set out, the novel system will be described making reference to the block diagram of FIG. 3 which illustrates an example.

The input unit A of this improved system comprises. N parallel signal transmission channels, each containing a frequency converter element in the form of a demodulator 1 whose two outputs are each connected through a low-pass filter 2 to a sampling device 3 controlled by a signal $H_o$ advantageously supplied by a master clock 31. The outputs of these two N sampling devices 3 are connected to a transfer circuit 4, termed a "multiplexer," controlled by a clock signal $H_1$, this circuit in turn being connected to an analog-to-digital converter 5 which is supplied with a clock signal $H_2$. The presence at the input of each of the N channels of demodulator unit 1 facilitates the initial filtering of the input signals $S_1$ to $S_n$, by converting the frequency modulation band $B_o$, of said signals, to a position around the frequency zero, this being tantamount to transforming these signals into complex signals each made up of a part X or "real" part and a part Y or "imaginary" part.

Demodulator unit 1 comprises two modulators 101 and 102 arranged in parallel, which are supplied with the input signal , $S_1$ for example, at their first input terminals. The second input terminals respectively receive an alternating signal, these two alternating signals, sine $\omega_o t$ and cos $\omega_o t$, being in quadrature with one another and emanating from a local oscillator, not shown, producing a frequency $f_o = \omega_o/2\pi$ equivalent to the center frequency of the band $B_o$. If there is a Doppler shift between the center frequencies of each of the input signals $S_1$ to $S_n$, it is possible to correct such shift by appropriately modifying the frequency of the local oscillators corresponding to each channel, thus defining distinct radian frequencies $\omega_{01}$ to $\omega_{on}$. The real parts $X_1$ to $X_n$ and imaginary parts $Y_1$ to $Y_n$ of the complex signals are then filtered by low-pass filters 2 with a cut-off frequency of $B_0 12$, before being sampled by the circuits 3 which are of the sample and hold type, i.e., analog memories.

In the unit B, recording circuits 6 controlled by a clock signal $H_3$, link the outputs X and Y of the analogue-to-digital converter 5 of unit A, to two corresponding groups of N circulatory memories 7, connected in parallel, the circulation rate of which is defined by a clock signal $H_4$. Read-out and channel-selection circuits 8, controlled by an device 9, governed by a clock signal $H_5$, transmit the complex signals, duly time-compressed in a ratio K, to the transfer circuits of unit C. If the slope of the linear frequency-modulation of the input signals has been modified by Doppler effect, this variation can be compensated for by modifying the time-compression ratio K. To do this, it is merely necessary to read-out each of the N registers of each group of memories 7, at frequencies which differ from one another by selected values.

After having experienced time-compression in the unit B, the input signals appear in the form of signal portions of duration $T_2/K$ which are successively selected by the circuits 8 for transmission to the transfer units C. In this fashion, time-division multiplexing is achieved.

In this unit C, two digital-to-analog converters 10, controlled by a clock signal $H_6$ and followed by two low-pass filters 11 with cut-off frequencies of K $B_0 12$, reconstruct the complex signal which is in a homothety ratio K to that at the selected input.

This complex signal is applied to a single-side band signal or comprising two modulators 12 which are also supplied with the quadrature signals sine $\omega_1 t$ and cos $\omega_1 T$ from another local oscillator (not shown) whose frequency is equal to the operating frequency $f_1$ of the dispersive delay line D, and which are connected to an adder 13.

The function of this single-side band system is to convert said complex frequency to the operating frequency of the dispersive delay line D.

This delay line D, which produces the mutual signal-replica correlation function, can be made up of several delay elements 15, for example four in number whose respective delays are distributed in accordance with desired weight factors. In the present case for example one element has a delay of $T_1/2$, two have a delay of $T_1/5$ and the fourth has a delay of $T_1/10$, each of these elements being connected to a switch 14.

Depending upon the position of the switch 14, it is thus possible to select one of ten possible combinations of line delays, in order to match the system to signals of different lengths.

It is known in the art to process the mutual signal replica correlation function provided; by a matched filter by means of envelope detection and automatic level control circuits. In accordance with this embodiment of the invention, this processing is carried out by a single output unit $E_o$ arranged at the output of the dispersive delay line D. This unit $E_o$ comprises an input gain controlled amplifier 16, followed by a detector 17 and by an output low-pass filter 18. In addition, a negative feed-back loop, comprising a low-pass filter 19, connects the output to the output unit input of the $E_o$. The signal $S_o$ appears at the output of $E_o$.

FIG. 4 illustrates the circuits which, when coupled to output unit $E_o$ and attendant signal $S_O$, produce N signals $S_{01}$ to $S_{0n}$ in parallel. Each correspond to a correlation function of one of the N inputs. These circuits separate the signals and effect the requisite time expansion for the restoration of the real time condition. In this arrangement, an input unit $E_1$ comprises a sampling device 20 controlled at the rate of 2.5 $K.B_o$ by a signal $H_7$ and an analog-to-digital converter 21. The analog-to-digital converter 21 is controlled by a signal $H_8$, with signals $H_7$ and $H_8$ being provided by master clock 31, which is common to the circuits of FIGS. 3 and 4. The unit $E_1$ effects the sampling and quantizing of the signal $S_0$ prior to its transmission to the time expander unit F. This unit F comprises a group of N circulatory memories 23 in parallel, the circulation rate of which is defined by a clock signal $H_{10}$, and comprises recording 22 and read-out and channel selection 24 circuits, the former, 22, being controlled by the clock signal $H_9$ and the latter, 24, by an adresing circuit 25 which is supplied with the clock signal $H_{11}$. The output unit G is made up of a digital-to-analog converter 26 controlled by the clock signal $H_{12}$. The output of the digital-to-analog converter 26 is connected simultaneously to N parallel circuits each comprising an analog storage sampling device 27 followed by a low-pass filter 29 with a cut-off frequency of $B_o$.

Each sampling device 27 is supplied in addition with control signals of frequency 2.5. $B_o$, cyclicly staggered in relation to one another, from a device 28.

If it is desired to obtain at an output of the system signal $S_{oo}$, corresponding to cyclic sampling of the N time-division multiplexed signals, it is merely necessary to connect the output of the digital-to-analogue converter 26 to a low-pass filter 30 of cut-off frequency N $B_o$.

This, then, describes the modifications and improvements applied to the prior art systems as disclosed in the United States patent hereinbefore referred to, in order to render said systems suitable for the simultaneous processing of several signal channels.

Thus, it is within the scope of the invention to replace the single frequency local oscillator signals sine $\omega_1 t$ and cos $\omega_1 t$ applied to the modulators 12 of the unit C in FIG. 3, by signals which are in phase quadrature and are linearly frequency-modulated with a slope related to the dispersion law of the delay line and in accordance with a cycle which is synchronous with the read-out period of the time-compression memory 7 of the unit B.

In this fashion, at the output of the dispersive line D, a signal is obtained which represents the Fourier Transform of the signal portion applied to the inputs of the modulators 12 from which is obtained the spectral density of the signals in each channel, successively. The selectivity of the spectral analysis thus effected, is equal to $1/T_o$.

The thus modified circuit effects matched filtering of multiple Doppler shifted signals received in response to transmission of a pure frequency of duration $T_o$.

The present invention is applicable in particular to the matched filtering of signals coming from panoramic sonar equipment with multiple performed beams.

The foregoing description has been given purely by way of non-limitative example and the invention of course extends to all the variant embodiments which can be contrived in accordance with the features set out hereinbefore.

Of course, the invention is not limited to the embodiment described and shown which was given solely by way of example.

What is claimed is:

1. A multichannel system for processing frequency modulated signals, utilizing matched filtering including an analog matched filter, which filter continuously produces a mutual correlation function between an input signal to the filter and a time-compressed replica of a transmitted wave form at an output of said filter, wherein said system simultaneously processes N input signals received at N channels thereof in response to a frequency modulated transmitted waveform and comprises, in a series connection:

an input unit including, means for separatly processing each independent analog input signal, frequency translation means and transform means for frequency translation of the signals and transformation thereof into splitted complex signal components, sampling means for receiving said signal components for taking samples thereof and means for multiplexing and quantizing said resultant components in respective serial order;

time-compression unit for said quantized signal components, time compressed in accordance with a time compression factor;

a transfer unit for reconverting said splitted signal components into analog form, frequency conversion means, recombination means thereafter for converting the analog form into a resulting signal translated in a frequency band of the matched analog filter;

at least one control source for producing clock signals synchronizing the operation of each of said units;

said matched filter unit receiving said resulting signal and producing said correlation function; and an output automatic gain control unit conducting a negative feed-back loop.

2. A system as claimed in claim 1, wherein in said input unit, each transmission channel assigned to a respective analog input signal comprises:

an input frequency converter including a demodulator unit comprising two modulators with first inputs thereof receiving said analog signal;

a local oscillator for generating, two alternating signals in phase quadrature, and a nominal frequency equal to the center frequency of the input signal frequency modulation band, said alternating signals being applied respectively to second inputs of the modulations, and splited resulting complex signal components, with local modulation band centered around frequency zero, appearing respectively as real and imaginary part signal components at corresponding demodulator unit outputs.

3. A system as claimed in claim 2, wherein the signals of said local oscillator signal frequency are variable about its nominal value for each said demodulator unit, each frequency being adjustable in order to correct for Doppler shifts between the center frequency of each said analog input signals.

4. A system as claimed in claim 2, wherein said demodulator unit outputs are each connected to a double transmission path, one path being assigned to said real part and the other to said imaginary part of the said complex signal components, each path comprising: a frequency filter followed by a sampling device under control of a said clock signal, a multiplexer circuit, all the double paths being connected at their outputs to the respective inputs thereof under control of another of said clock signals and a quantizing device coupled to the output of each multiplexer, the output of each of said quantizing devices being connected to two respectively corresponding inputs of said time-compression unit.

5. A system as claimed in claim 4, wherein said frequency filter comprises:

a low-pass type with a cut-off frequency equal to half the frequency modulation band of the respective one of the said N analog input signals;

said sampling device is a sampler of an analog memory type;

said multiplexer circuit is a time-division multiplex device; and said quantizing device is an analog-to-digital converter.

6. A system as claimed in claim 1, wherein said time-compression unit, simultaneously processing respectively real imaginary components of said complex signal, comprises:

a real parts write-in circuit and an imaginary parts write-in circuit under control of a common clock signal;

a group of N parallel connected circulatory memories under control of another common clock signal having responsive inputs coupled to outputs of each write-in circuit;

output read-out circuits receiving memories output signals corrsponding to respective real and imaginary signal parts corresponding to an addressing device controlled by a further clock signal governing the read out circuits;

the circulation of the different signals in the processing channels being carried in accordance with a selected operation rythmn controlled by said clock signals, such as to impart to said signal parts components a desired ratio time-compression and a memory holding time the duration of which exceeds the duration of the transmitted signal.

7. A system as claimed in claim 6, wherein said circulatory memories are shift registers, with a time-compression ratio variable in accordance with a read-out rate thereof such as to compensate for possible variation in a frequency modulation slope of each of the said N input signals due to Doppler shift.

8. A system as claimed in claim 1, wherein said transfer unit, receiving on its inputs respectively said complex signal real part component and imaginary part component time-compressed in accordance with a selected homothety ratio value, comprises a similar series connected arrangement respectively for real and imaginary components comprising:

an input digital-to-analog converter under control of a common clock signal;

a low-pass filter;

a modulator and a local oscillator for supplying thereto a sinusoidal signal with a nominal signal frequency equal to the operating frequency of the analog matched filter, the sinusoidal signals applied to respective modulators being in phase quadrature and each modulator producing a suppressed carrier output signal; and further a common adder receiving on its inputs respectively output signals of said modulators then recombined into a resulting S.S.B. signal centered at the center frequency of the said matched filter, formed of a dispersive delay line.

9. A system as claimed in claim 8, wherein said sinusoidal signals in phase quadrature are linearly frequency modulated in accordance with a cycle synchronized with the memories read-out rate of the time compression unit, at a frequency modulation slope matched with the dispersion slope of the dispersive delay line, thus enabling spectral analysis of each of the said N input signals to be successively effected.

10. A system as claimed in claim 1, wherein the matched filter comprises:

discrete dispersive delay lines with propagation times which are distributed in accordance with selected weighting factors of a determined value and selectable by means of a switch to realize one of several possible combinations of said times thus matching said filter to different possible durations of the said quantized signal.

11. A system as claimed in claim 1, wherein said output unit connected to said matched filter output comprises, in a series connection:

a variable gain amplifier;

a modulation envelope detector; and a low pass filter, the formed negative feed-back loop comprising a further low-pass filter and providing a fast-action A.G.C.

12. A system as claimed in claim 11, wherein the signals appearing at the output of the said output unit are applied to a circuit arrangement comprising:

a sampling and digital quantizing unit respectively controlled by a separate clock signal and connected to the said output unit output terminal;

a time expander unit, following, under control of clock signals and comprising: a group of parallel memories connected between a write-in unit and a read-out and signal transmission channel selection unit realizing signal time division multiplexing under control of an associated adressing unit receiving a clock signal; and an N analog signals output unit comprising:

a multiplexed signal input digital-to-analog converter controlled by a clock signal, a group of N storage type analog sampling circuits in parallel connected to the output of said converter and cyclically operated by means of a control circuit, and a group of N parallel low-pass filters respectively connected to the sampling circuits outputs and delivering said N analog signals.

13. A system as claimed in claim 12, wherein:

said digital-to-analog converter output is connected to a low-pass filter with a cut-off frequency equal to N times that of the other low-pass filters to derive a discrete analog signal corresponding to cyclic sampling of the N time division multiplexed signals.

* * * * *